United States Patent
Koste et al.

(10) Patent No.: US 8,514,409 B2
(45) Date of Patent: Aug. 20, 2013

(54) SYSTEM FOR MONITORING A RELATIVE DISPLACEMENT OF COMPONENTS

(75) Inventors: Glen Peter Koste, Niskayuna, NY (US);
Renato Guida, Niskayuna, NY (US);
Paul Jeffrey Gillespie, Niskayuna, NY (US); Hua Xia, Niskayuna, NY (US);
Bowden Kirkpatrick, Niskayuna, NY (US); Haiyan Sun, Schenectady, NY (US); Sachin Narahari Dekate, Niskayuna, NY (US); Mosharraf Hossain, Schenectady, NY (US);
Sunilkumar Onkarnath Soni, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 18 days.

(21) Appl. No.: 13/362,258

(22) Filed: Jan. 31, 2012

(65) Prior Publication Data

US 2012/0154821 A1 Jun. 21, 2012

Related U.S. Application Data

(63) Continuation-in-part of application No. 12/750,857, filed on Mar. 31, 2010, now Pat. No. 8,379,225.

(51) Int. Cl.
*G01B 11/14* (2006.01)

(52) U.S. Cl.
USPC .......................................... 356/614; 356/620

(58) Field of Classification Search
USPC .................. 356/614, 615, 620, 622, 32–35.5; 385/12, 37, 13, 141, 142, 144; 250/227.14, 250/227.11, 227.18, 227.23, 227.24, 227.21; 73/800; 374/130, 131, 161
See application file for complete search history.

(56) References Cited

U.S. PATENT DOCUMENTS

| 4,861,131 A | 8/1989 | Bois |
| 5,563,967 A | 10/1996 | Haake |

(Continued)

FOREIGN PATENT DOCUMENTS

| EP | 1890374 A2 | 2/2008 |
| GB | 2421075 A | 6/2006 |

(Continued)

OTHER PUBLICATIONS

Feng et al., The Study of a Particular Type of Capacitive Transducer for Large Displacement Measurement, Control Automation, Robotics and Vision, 2006. ICARCV '06. 9th International Conference, Published Dec. 5-8, 2006, Print ISBN: 1-4244-0341-3, pp. 1-4.

*Primary Examiner* — Tri T Ton
(74) *Attorney, Agent, or Firm* — Ann M. Agosti

(57) ABSTRACT

A system is provided for monitoring a relative displacement of a pair of end-winding components. The system includes a structure mounted to the end-winding components at an angle with respect to the end-winding components for monitoring the relative displacement. The system further includes an optical fiber with a first portion including a fiber Bragg grating mounted to a surface of the structure to experience a strain resulting from a strain of the structure due to the relative displacement. The optical fiber includes a second portion internally routed through in the structure to the first portion mounted to the surface. The structure is configured so that the strain produced by the structure limits a magnitude of the strain of the fiber Bragg grating within a predetermined range over a span of the relative displacement of the end-winding components.

21 Claims, 9 Drawing Sheets

(56) References Cited

U.S. PATENT DOCUMENTS

| | | | |
|---|---|---|---|
| 6,050,092 A | 4/2000 | Genstler et al. | |
| 6,069,985 A * | 5/2000 | Albin et al. | 385/12 |
| 7,323,678 B2 | 1/2008 | Abrate | |
| 2006/0043268 A1 | 3/2006 | Abrate et al. | |
| 2009/0022450 A1 | 1/2009 | Song | |
| 2009/0026864 A1 | 1/2009 | Ichiyama | |
| 2009/0126501 A1 | 5/2009 | Feguson | |
| 2009/0278544 A1 | 11/2009 | Webb | |
| 2010/0074572 A1 | 3/2010 | Zheng et al. | |
| 2010/0236336 A1 | 9/2010 | Meyer et al. | |
| 2011/0242546 A1 | 10/2011 | Koste et al. | |

FOREIGN PATENT DOCUMENTS

| | | |
|---|---|---|
| GB | 2473903 A | 3/2011 |
| JP | 2001099729 A | 4/2001 |
| KR | 20000065493 A | 11/2000 |
| WO | 2009121367 A1 | 10/2009 |
| WO | 2010030456 A2 | 3/2010 |

* cited by examiner

SYSTEM FOR MONITORING A RELATIVE DISPLACEMENT OF COMPONENTS

CROSS-REFERENCE TO RELATED APPLICATIONS

This application is a Continuation-In-Part of U.S. application Ser. No. 12/750,857 filed on Mar. 31, 2010 now U.S. Pat. No. 8,379,225, which is incorporated by reference herein.

BACKGROUND

Aspects of the invention relate generally to a system for monitoring a relative displacement of components and, more particularly, to a system for monitoring a relative displacement of components, such as end-winding components of an electromotive machine, such as a generator.

Rotating machines, such as motors, electric generators which may be driven by steam turbines or gas turbines have the capacity to carry several thousand amperes of current in their stator windings. Stator windings generally comprise conductive bars secured in corresponding slots in a stator core and end windings extending beyond the stator core. End-winding components are subject to electro-dynamic and mechanical forces that induce a displacement of the end windings. Electro-dynamic forces are induced, for example, by large current passing through the end windings during starting and peak load conditions. Mechanical forces are caused by normal mechanical thermal expansion and vibrations of the rotating machine. It has been recognized that an excessive displacement of the end windings has several undesirable effects including that the winding insulation in the end windings may be destroyed leading to dielectric breakdown between end windings, and end windings may suffer from wear due to electromechanical forces that lead to premature failure of the rotating machine. There is a need in the art to monitor the end winding status, and an early and accurate detection of end winding loosening is desirable.

Conventional systems have been proposed, to detect the displacement of end winding components. However, electronic based systems have metal components that cannot be used near end winding components due to the high electromagnetic fields, and optical vibration measurement systems are too expensive for cost effective use. Thus, it would be advantageous to provide a monitoring system which at least addresses these shortcomings.

BRIEF DESCRIPTION

In accordance with an example embodiment, a system is provided for monitoring a relative displacement of a pair of end-winding components. The system includes a structure mounted to the pair of end-winding components such that the structure is oriented at an angle with respect to the pair of end-winding components for monitoring the relative displacement. The system further includes an optical fiber with a first portion including a fiber Bragg grating mounted to a surface of the structure. The fiber Bragg grating is configured to experience a strain resulting from a strain of the structure due to the relative displacement of the pair of end-winding components. The optical fiber includes a second portion internally routed in the structure to the first portion mounted to the surface. The structure is configured so that the strain produced by the structure limits a magnitude of the strain of the fiber Bragg grating within a predetermined range over a span of the relative displacement of the pair of end-winding components.

In accordance with another example embodiment disclosed herein, a system is provided for monitoring a relative displacement of a pair of end-winding components. The system includes a structure including a first base leg and a second base leg respectively mounted to the pair of end-winding components. The system further includes an optical fiber with a first portion including a fiber Bragg grating mounted to a surface of the structure, where the fiber Bragg grating is configured to experience a strain resulting from a strain of the structure due to the relative displacement of the pair of end-winding components. The optical fiber includes a second portion internally routed through a first slot in the first base leg to the first portion mounted to the surface. The optical fiber is further routed from the surface to a third portion of the optical fiber internally routed through a second slot in the second base leg. The structure is configured so that the strain produced by the structure limits a magnitude of the strain of the fiber Bragg grating within a predetermined range over a span of the relative displacement of the pair of end-winding components.

In accordance with another example embodiment disclosed herein, a power generation device is provided, including a pair of end-winding components configured to undergo a relative displacement during an operation of the power generation device. The power generation device further includes a structure mounted to the pair of end-winding components such that the structure is oriented at an angle with respect to the pair of end-winding components for monitoring the relative displacement. The power generation device further includes an optical fiber with a first portion including a fiber Bragg grating mounted to a surface of the structure. The optical fiber includes a second portion internally routed within the structure to the first portion mounted to the surface. The fiber Bragg grating is configured to experience a strain resulting from a strain of the structure due to the relative displacement of the pair of end-winding components. The structure is configured so that the strain produced by the structure limits a magnitude of the strain of the fiber Bragg grating within a predetermined range over a span of the relative displacement of the pair of end-winding components.

DRAWINGS

These and other features, aspects, and advantages of aspects of the present invention will become better understood when the following detailed description is read with reference to the accompanying drawings in which like characters represent like parts throughout the drawings, wherein.

DETAILED DESCRIPTION

Example embodiments of the invention are described in the context of stator end winding monitoring systems using fiber optic sensing cables for measuring relative displacement of end-winding components, including but not limited to supporting or connecting components directly or indirectly supporting or connecting with stator end windings including but not limited to connection rings and stator bars. Relative displacement between end-winding components is an indication of stator end winding status. "Relative displacement" herein after refers to a shift of a distance between two end-winding components. The two end-winding components may be directly adjacent to each other, or may be separated by one or more end-winding components there between. As used herein the terms "a," "an," and "the" do not denote a limitation of quantity, but rather denote the presence of at least one of the referenced items. Similarly, as used herein "two end-winding components" means at least two end-winding components.

Figure 1:
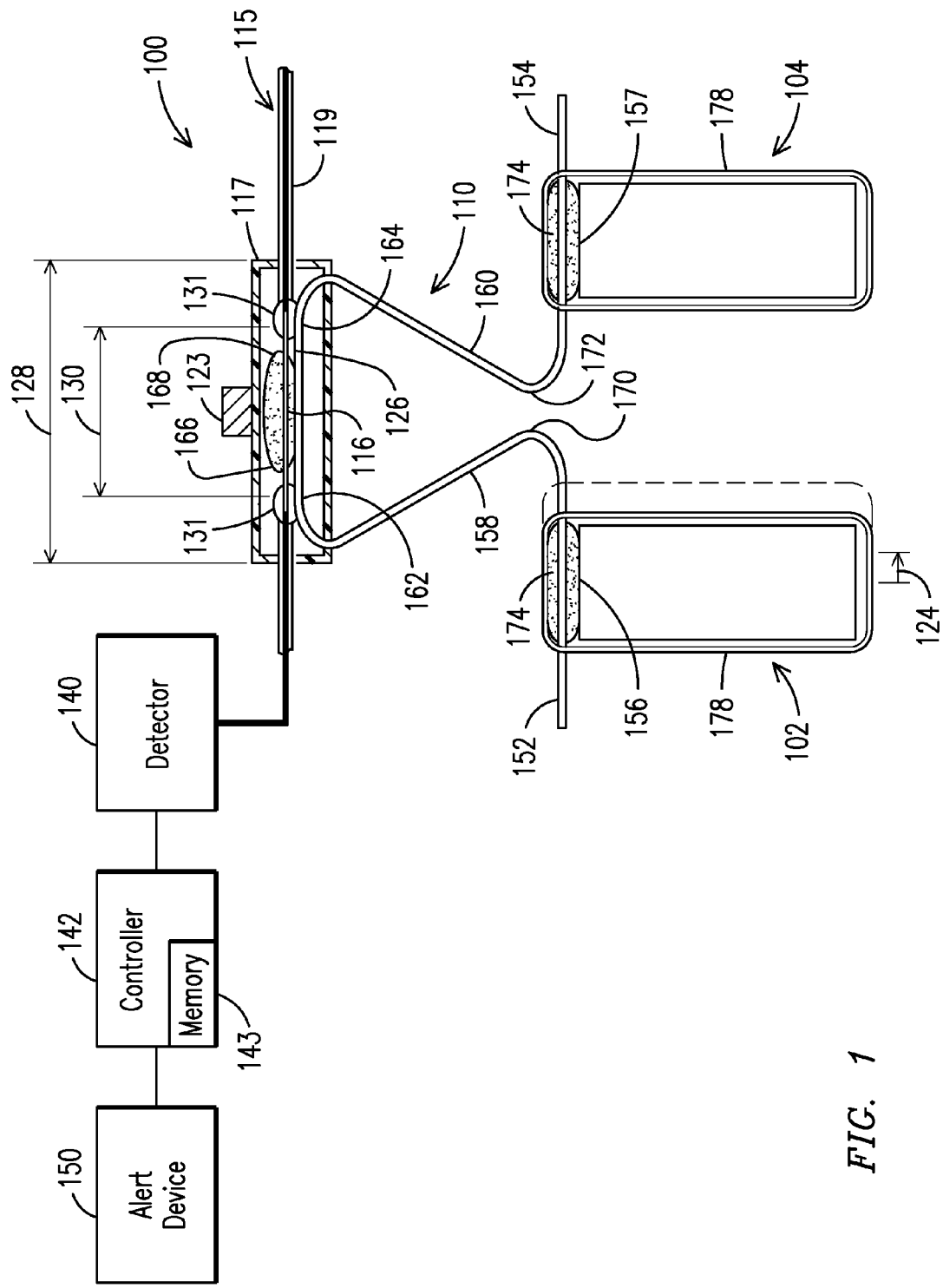
FIG. 1 is a partial side cross-sectional view of a structure and a fiber Bragg grating mounted on a pair of end-winding components according to an example embodiment of the invention.

FIG. 1 illustrates an example embodiment of a system 100 for monitoring a relative displacement 124 of a pair of end-winding components 102,104. In an example application, the system 100 may be used in a power generating device, such as an electrical generator, and the components 102,104 may be end-winding components of an electrical generator, for example. In another example application, the components 102,104 may be positioned in a high voltage and/or high magnetic field region, such as within a pressure vessel, which may not be easily accessible, for example. The components 102,104 are subject to relative displacement 124, during the operation of the generator. In one example embodiment of the present invention, the system 100 is configured to ensure that the relative displacement 124 of the components 102,104 does not to exceed a threshold or maximum relative displacement, and to configure a sensor which is capable of detecting the relative displacement 124 of the components 102,104 over a span of the relative displacement. For example, a maximum relative displacement of the components 102,104 may be 1.27 mm. However, example embodiments of the present invention are not limited to any particular numerical maximum relative displacement. The relative displacement of 1.27 mm of the components 102,104 may result from one component remaining stationary and another component shifting by 1.27 mm, or each component simultaneously displacing toward or away from one another by 0.635 mm, for example.

As illustrated in FIG. 1, a fiber Bragg grating 116 is generated within an optical fiber 115. The fiber Bragg grating 116 portion of the optical fiber 115 is securely affixed to a surface 126. In one exemplary embodiment, the surface 126 may be non-curved, that is, a flat surface but for standard manufacturing tolerances and/or nominal deviations, as will be appreciated by one of skill in the art. For protection, a jacket 119 may surround the optical fiber 115. The jacket 119 may be externally mounted to the surface 126 with a strain relief component 131 at each end 166,168 of the fiber Bragg grating 116, to provide additional mechanical link strength and prevent the fiber Bragg grating 116 from snapping away from the optical fiber 115.

It will be appreciated that the ability to externally mount fiber Bragg grating 116 onto surface 126 allows to accurately establish in a design stage of the structure a ratio of the amount of strain to the amount of relative motion. This ratio may be advantageously established in the design stage through appropriate selection of parameters of the structure, such as height and thickness. Furthermore, this ratio may be selected to be substantially constant for each structure manufactured, since the structure's dimensions can be controlled within standard manufacturing tolerances and/or nominal deviations, as will be appreciated by one of skill in the art.

It will be further appreciated that in an exemplary embodiment, the structure may be designed with a non-curved surface for mounting the fiber Bragg grating, the strain at all portions of the fiber Bragg grating will be substantially the same. This is advantageous since the respective wavelength of the reflected radiation having the peak intensity is unambiguous. If different portions of the fiber Bragg grating, which is typically about 1 centimeter long, experienced different strain, then the reflected radiation may have several peak wavelengths or a spectrally widened reflected spectrum. Under these conditions the peak may be difficult to discern, causing ambiguity in the estimated strain. A substantially flat surface with a length equal to or greater than the fiber Bragg grating length insures a uniform strain on the grating and an unambiguous peak wavelength.

As further illustrated in FIG. 1, a cover 117 is positioned around the fiber Bragg grating 116 and the strain relief component 131, for additional protection. The cover 117 is made from a non-conductive, polymer material, for example. Although FIG. 1 illustrates a fiber Bragg grating within an optical fiber, any fiber optic sensing cable may be used for measuring relative displacement of the end-winding components.

As illustrated in FIG. 1, the structure 110 includes a surface 126 onto which the jacket 119 (and fiber Bragg grating 116) may be externally mounted. Additionally, as illustrated in FIG. 1, the surface 126 has a length which may be a minimum length 128 based on a length 130 of the fiber Bragg grating 116. In an exemplary embodiment, the minimum length 128 is greater than the length 130 of the fiber Bragg grating 116, and may be greater than the combined length of the fiber Bragg grating 116 and the strain relief component 131 at each end 166,168, for example. In an exemplary embodiment, the fiber Bragg grating 116 is externally mounted to the surface 126 of the structure 110 with a suitable bonding material, such as a thermoset polymer, or any other material that is capable of holding items affixed to one another by surface attachment. In an exemplary embodiment, the length 128 of the surface 126 may be two centimeters, for example. However, the length 128 of the surface 126 of the invention is not limited to such dimensions.

Figure 2:
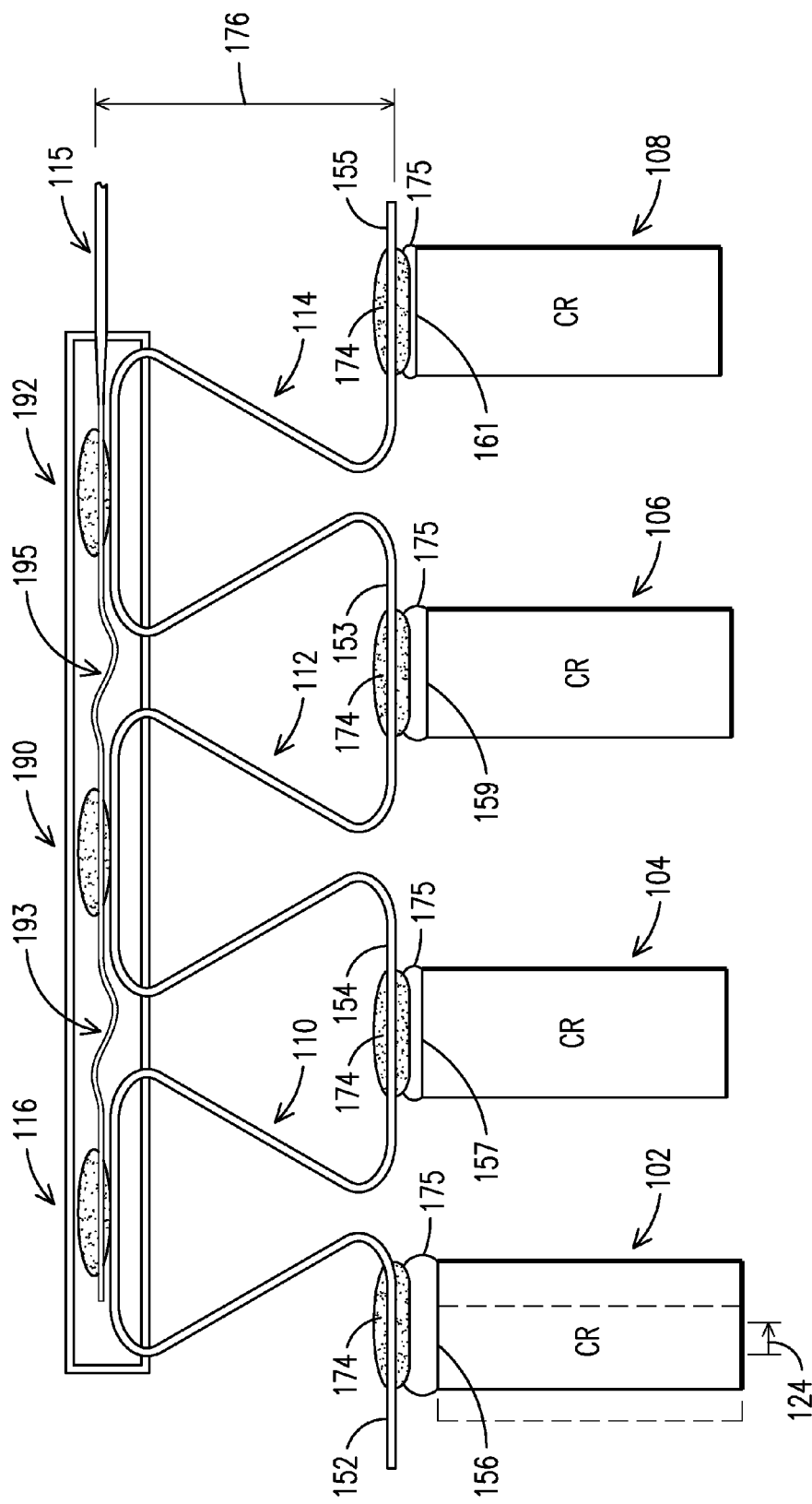
FIG. 2 is a partial side cross-sectional view of a plurality of structures and fiber Bragg gratings mounted on the end-winding components according to another example embodiment of the invention.

The structure 110 further includes a pair of base legs 152, 154, where the respective base legs 152, 154 are mounted to a respective first surface, or respective top surface 156, 157 of the components 102, 104. As illustrated in FIG. 1, the structure 110 also includes a pair of intermediate portions 158, 160 which link a respective base leg 152, 154 to a respective outer end 162, 164 of the surface 126. In an exemplary embodiment, the respective outer end 162, 164 is longitudinally aligned with the respective outer end 166, 168 of the fiber Bragg grating 116. The intermediate portions 158, 160 are aligned with the base legs 152, 154 and the surface 126 at any one of a number of angles from 10 to 170 degrees. In an exemplary embodiment, the angle formed between the intermediate portions 158, 160 and the base legs 152, 154 and/or surface 126 may be 60 degrees, for example. As illustrated in FIG. 1, the structure 110 takes a reverse-triangular shape, in which the intermediate portions 158, 160 extend from the respective outer end 162, 164 of the surface 126, in an inward direction relative to the fiber Bragg grating 116, to an end 170, 172 of the respective base leg 152, 154. The respective ends 170, 172 of the base leg 152, 154 are separated by less than the length 128 of the surface 126. The respective base leg 152, 154 is mounted to the top surface 156, 157 of the respective component 102, 104 with an adhesive 174, such as two-part epoxy, for example. As illustrated in FIG. 2, the base leg 152, 154 are mounted to the top surfaces 156, 157 of the components 102, 104 with a respective amount of leveling material 175, to equalize a height 176 at which the base leg 152, 154 are respectively mounted to the top surfaces 156, 157 of the components 102, 104.

As further illustrated in FIG. 1, a tie 178 is wrapped around an exterior surface of the respective component 102, 104, including the top surface 156, 157 of the respective component 102, 104 and around the respective base leg 152, 154 of the structure 110, to enhance the mounting of the respective base leg 152, 154 of the structure 110 to the top surface 156, 157 of the component 102, 104.

As appreciated by one of skill in the art, the fiber Bragg grating 116 is configured to reflect incident radiation through the optical fiber 115 at a respective wavelength having a peak intensity, based on a strain 122 (see FIGS. 4-5) of the fiber Bragg grating 116. As previously discussed, strain is based on a ratio of a variation in length of the fiber Bragg grating 116 (as a result of the relative displacement 124 of the components 102, 104) to the initial length of the fiber Bragg grating 116 (and similarly defined for other strain parameters discussed in this disclosure). The fiber Bragg grating 116 has a threshold strain range or maximum strain range, which may be provided by the manufacturer, for example, beyond which the fiber Bragg grating 116 will mechanically break down and/or fail to generate wavelength data which accurately reflects the strain forces to which it is being subjected. Thus, example embodiments of the present invention may attenuate a range of the strain 122 experienced by the fiber Bragg grating 116 (as a result of relative displacement 124 of the components 102, 104) to be within the maximum strain range of the fiber Bragg grating 116. In an exemplary embodiment, a Micron Optics os3200 fiber Bragg grating strain sensor may be utilized in certain embodiments of the present invention, which has a maximum strain range of +/−5000 microns/m. However, further example embodiments of the present invention may be utilized with any fiber Bragg grating which is utilized to monitor a relative displacement of a component, such as a connection ring of an electrical generator, for example.

As the components 102, 104 are subject to the relative displacement 124, during the typical operation of the components, the surface 126 of the structure 110 is subject to strain, and thus the fiber Bragg grating 116 is subject to strain 122, as a result of the relative displacement 124 of the components 102, 104. The structure 110 is designed to attenuate a range of the strain 122 of the fiber Bragg grating 116 over a range of the relative displacement 124 of the components 102, 104, to within a maximum range of the strain of the fiber Bragg grating 116. The fiber Bragg grating 116 is externally mounted to the surface 126 of the structure 110, such that the range of the strain 122 of the fiber Bragg grating 116 over the span of the relative displacement 124 of the components 102, 104 is within a range of the strain of the surface 126 of the structure 110 over the span of the relative displacement 124 of the components 102, 104. The fiber Bragg grating 116 is externally mounted to the surface 126, and in one exemplary embodiment the surface 126 may be non-curved and/or flat, as discussed above, such that the strain of the surface 126 over the span of the relative displacement of the components 102, 104 is substantially uniform over the minimum length 128 of the surface 126, to ensure that the fiber Bragg grating 116 experiences a substantially uniform strain 122 over the minimum length 128 along which it is mounted to the surface 126.

Figure 3:
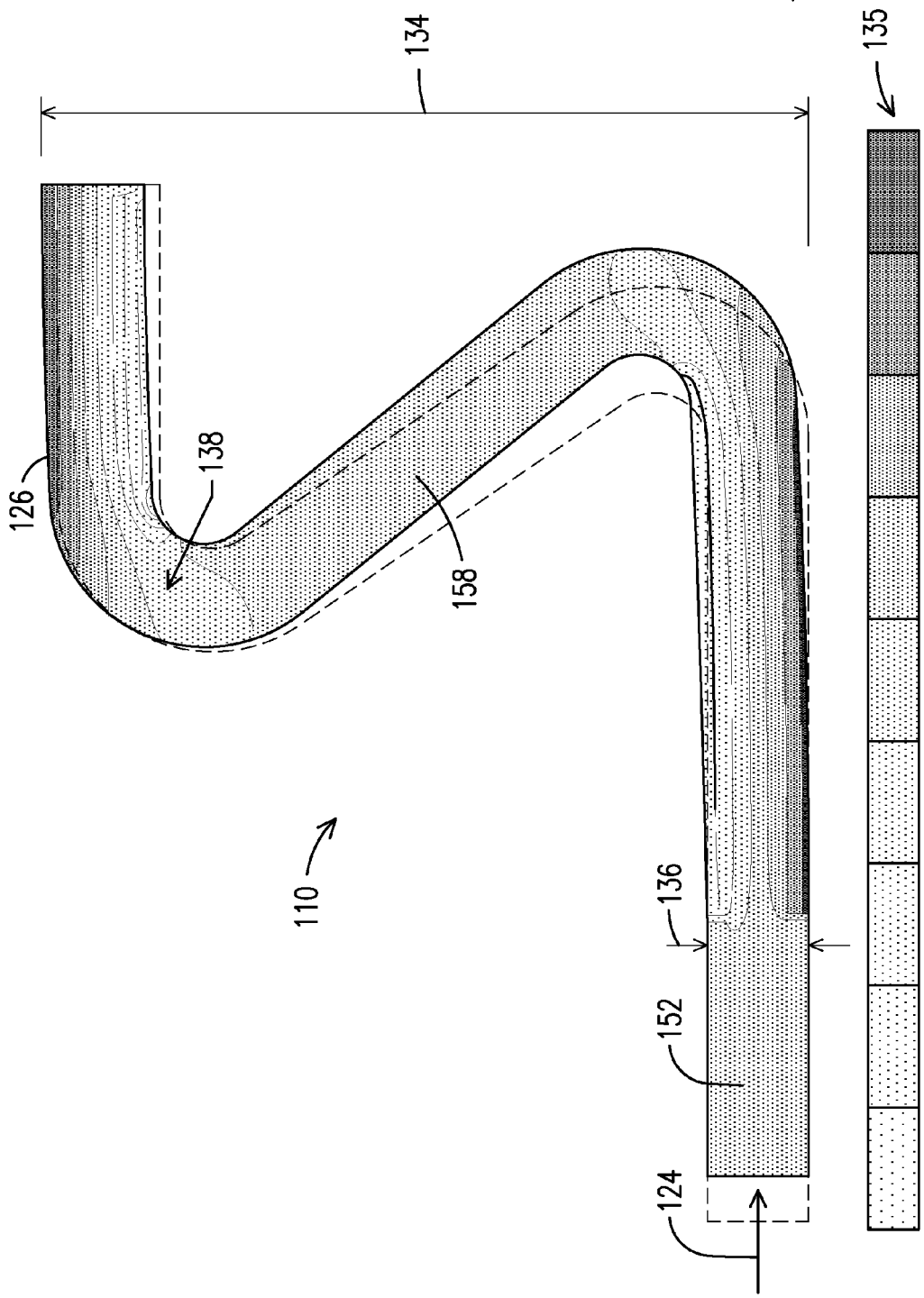
FIG. 3 is a partial cross-sectional side view of the structure in FIG. 1, such as during a design phase.
Figure 4:
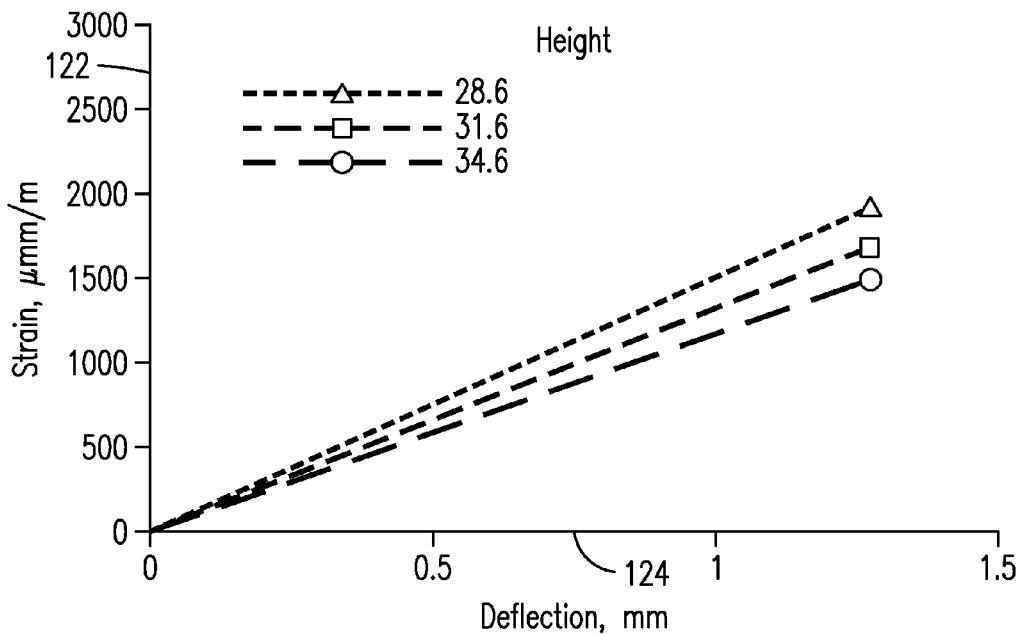
FIG. 4 is a plot of example strain of the fiber Bragg grating versus a deflection of the end-winding components for respective example heights and a fixed example thickness of the structure illustrated in FIG. 3.
Figure 5:
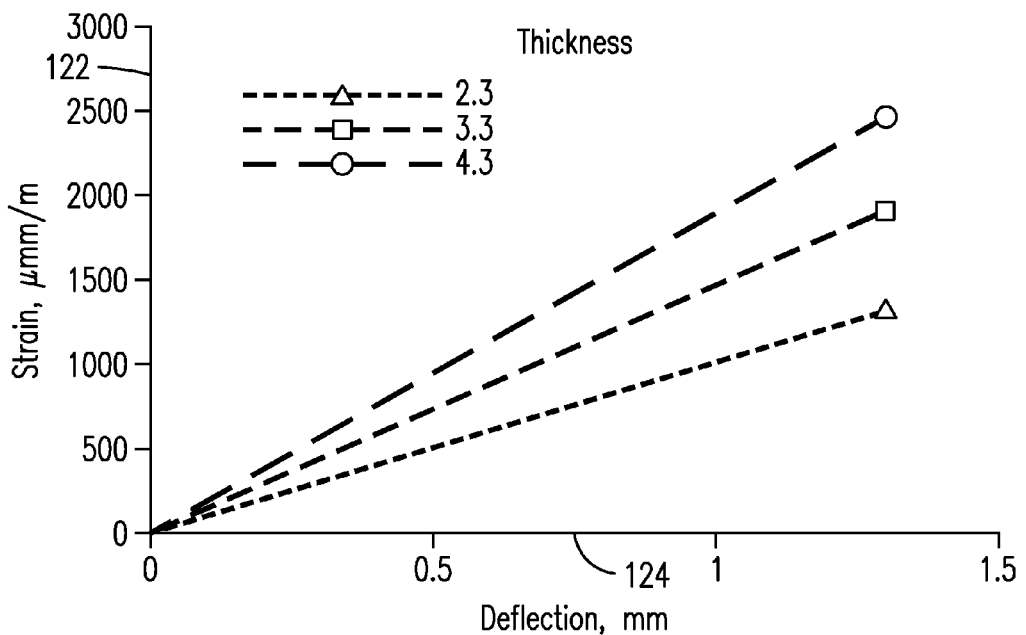
FIG. 5 is a plot of example strain of the fiber Bragg grating versus a deflection of the end-winding components for respective example thicknesses and a fixed example height of the structure illustrated in FIG. 3.

As illustrated in FIGS. 3-5, during a design mode of the structure 110, a parameter of the structure 110 is adjustably selected, such that the range of the strain of the surface 126 of the structure 110 over the span of relative displacement 124 of the components 102, 104 is within the maximum range of the strain 122 of the fiber Bragg grating 116. As previously discussed, the span of relative displacement 124 of the components 102, 104 may be known, such as 1.27 mm, for example. Additionally, the maximum range of the strain 122 of the fiber Bragg grating 116 may be known, such as 2500 microns/m, for example. Although the design mode of FIGS. 3-5 was performed for specific boundary conditions of the span of relative displacement 124 of the components 102, 104 and the maximum range of the strain 122 of the fiber Bragg grating 116, the design mode may be performed for any specific boundary conditions, based on the methods discussed herein. As illustrated in FIG. 3, the parameter of the structure 110 which is adjusted during the design mode of the structure 110 is the height 134 of the structure, the thickness 136 of the structure 110 and/or a radius of curvature 138 of a turn of the structure 110 which joins the surface 126 to an intermediate portion 158 (and a similar turn which joins the intermediate portion 158 to the base leg 152). Note that the embodiment of FIG. 3 illustrates a half-symmetrical view of the structure 110, as the other half of the structure 110 is similarly designed, in a symmetrical manner, as appreciated by one of skill in the art.

The design mode of the structure 110 illustrated in FIGS. 3-5 utilizes a CAD (Computer Aided Design) model, which is utilized to provide a geometrical representation of the structure 110, with a particular height, thickness and radius of curvature at each turn, as appreciated by one of skill in the art. The CAD model is utilized to provide a geometric model of the structure 110, but the CAD model alone does not provide model strain or force data within the structure 110 or along the surface 126, for example, in response to relative displacement of the base leg 152, based on relative displacement 124 of the components. As previously discussed, example embodiments of the invention are directed to configuring a structure 110 with a range of strain along the surface 126 to be within a maximum range of strain 122 of a fiber Bragg grating 116, across a span of relative displacement 124 of the components 102,104. In the exemplary embodiment, the design mode is directed to configuring a structure 110 with a surface 126 having a range of strain to be within 2500 microns/m, across a span of relative displacement of 1.27 mm In order to consider the strain or force data on the geometric CAD model of the structure 110, the design mode of the structure 110 utilizes a FEA (finite element analysis) model, in which the CAD model of the structure 110 is separated into a plurality of individual elements which are subject to respective force equations, as appreciated by one of skill in the art. FIG. 3 illustratively depicts the strain along the surface 126 of the structure 110, across the span of relative displacement 124, using a Von Mises strain scale 135. As illustrated in FIG. 4, using the FEA model of the structure 110, the strain along the surface 126 is computed across a span of deflection of 1.27 mm, for a number of structures having various heights 134, including 28.6 mm, 31.6 mm, and 34.6 mm, while keeping the thickness 136 fixed at 3.3 mm. Similarly, as illustrated in FIG. 5, using the FEA model of the structure 110, the strain along the surface 126 is computed across a span of deflection of 1.27 mm, for a number of structures having various thicknesses 136, including 2.3 mm, 3.3 mm, and 4.3 mm, while keeping the height 134 fixed at 28.6 mm. As illustrated in FIG. 3, the design mode results in configuring the structure 110 to have a height 134 of 24 mm, a thickness 136 of 4 mm and a radius of curvature 138 at the turns of 4 mm, in order to have a range of strain along the surface 126 of 2453 microns/m, and thus to be within the maximum range of strain 122 of the fiber Bragg grating, 2500 microns/m. As previously discussed, these particular strain ranges and dimensions of the structure 110 designed from the design mode are merely exemplary, and example embodiments of the invention may be utilized to design any structure to attenuate the strain of a fiber Bragg grating over a span of relative displacement of the components, to be within the maximum range of the strain of the fiber Bragg grating, by following the same steps discussed herein. Although the FEA model of the structure 110 resulted in a height 134 of 24 mm, a thickness 136 of 4 mm and a radius of curvature of 4 mm, the structure 110 parameters are not limited to these numeric values, and include a range of height 134 of 10-40 mm, a range of thickness 136 of 1-5 mm and a range of the radius of curvature of 1-5 mm. More specifically, example embodiments of the present invention may include a range of height 134 of 22-26 mm, a thickness 136 of 3.5-4.5 mm, and a radius of curvature 138 of 3.5-4.5 mm, for example. As appreciated by one of skill in the art, the parameters of the structure will vary, based on the initial boundary conditions used in the FEA model, including but not limited to, the maximum relative displacement of the components, as well as the maximum range of the strain of the fiber Bragg grating, for example.

Based on the design mode discussed above, the fiber Bragg grating 116 is configured to have the parameters, including the height 134, thickness 136 and radius of curvature 138 of the turns, as discussed above. As illustrated in FIG. 1, a multi-wavelength optical source (not shown) is connected to the optical fiber 115 and transmits multiple wavelengths of light to the fiber Bragg grating 116. Light reflected from the fiber Bragg grating 116 passes to a detector 140 that measures a shift in the respective wavelength of the reflected radiation having the peak intensity, at respective incremental displacements across the span of the relative displacement 124 of the components 102,104. As appreciated by one of skill in the art, the detector 140 is initialized to measure a shift in the wavelength of the reflected radiation from a central wavelength corresponding to a beginning strain 122 of the fiber Bragg grating 116. The central wavelength may be customized for each fiber Bragg grating, and may be provided by the manufacturer. A controller 142 is coupled to the detector 140, receives the reflected wavelength data, and converts the shift in the respective wavelength of the reflected radiation having the peak intensity into the strain 122 of the fiber Bragg grating 116 over the respective incremental displacement across the span of the relative displacement 124 of the components 102,104. In an exemplary embodiment, the controller 142 may utilize an equation to convert the wavelength shift of the reflected radiation to the strain 122 of the fiber Bragg grating 116, such as:

$$\in = \Delta\lambda / |\lambda| G * 10^6 \quad \text{Equation 1}$$

Where $\in$ is the strain 122 of the fiber Bragg grating 116, $\Delta\lambda$ is the measured shift in the wavelength from the central wavelength, $|\lambda|$ is the absolute value of the measured wavelength and G is the gauge factor for the fiber Bragg grating 116. In an exemplary embodiment, the gauge factor is 0.81, for example. The gauge factor may vary with each fiber Bragg grating, and may be provided by the manufacturer, for example.

Figure 6:
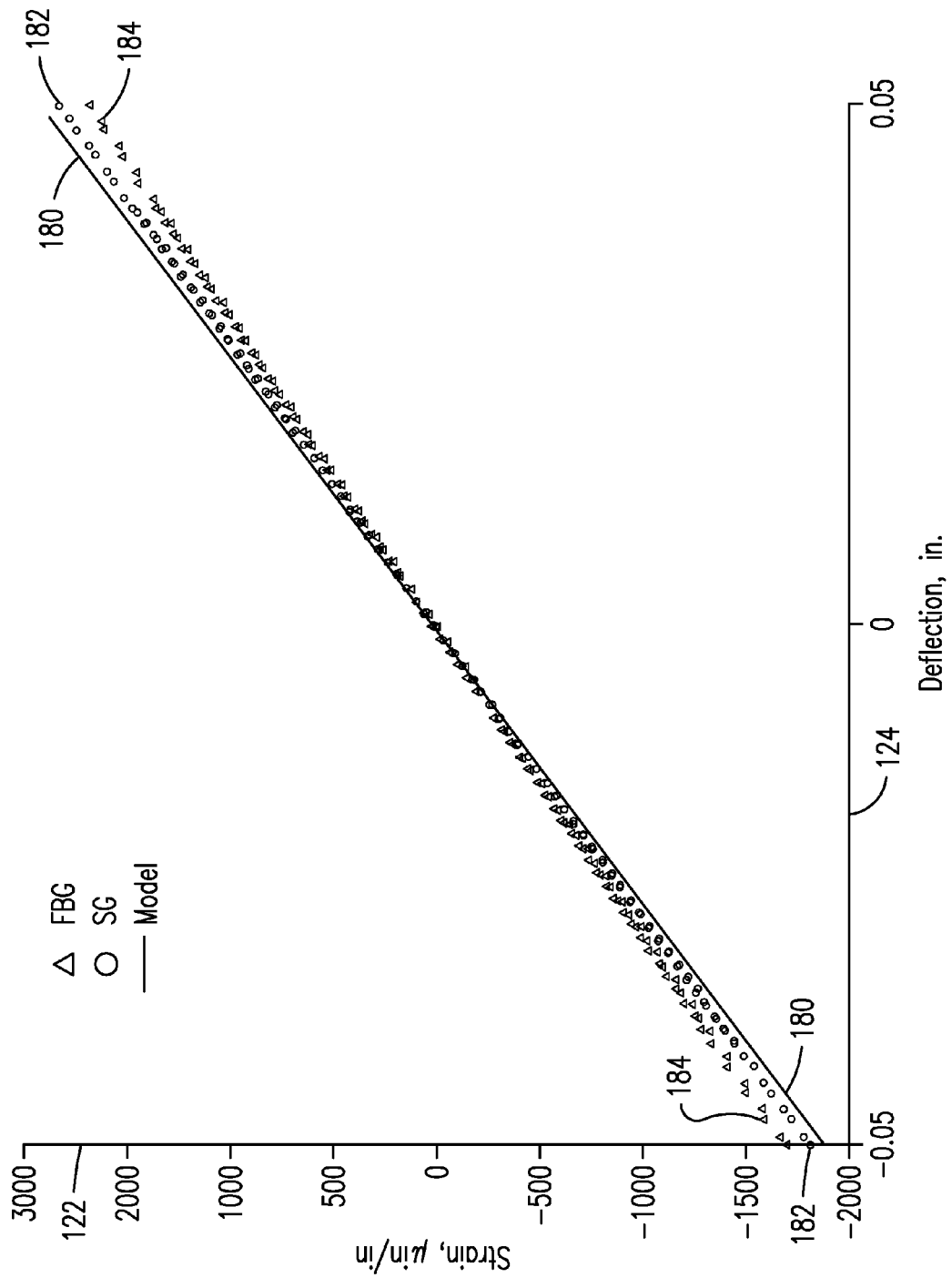
FIG. 6 is a plot of example strain of the fiber Bragg grating over a span of example displacement of the end-winding components illustrated in FIG. 1.

During a calibration mode of the system 100, the respective wavelength shift of the reflected radiation having the peak intensity is converted into an estimated strain data 184 (equation 1) over the respective incremental displacements 124. Additionally, as illustrated in FIG. 6, the estimated strain data 184 including the respective strain 122 of the fiber Bragg grating 116 is plotted, versus the incremental displacement 124 of the components 102,104. As illustrated in FIG. 6, the estimated strain data 184 is closely matched to the FEA model data 180, based on the strain data acquired during the design mode of the FEA structure. Additionally, strain gauge data 182 is illustrated in FIG. 6, which represents the measured strain of a strain gauge 123 (FIG. 1) of the surface 126, over the span of the relative displacement 124. As appreciated by one of skill in the art, the strain gauge 123 is a gauge made from a foil metal material, whose electrical properties vary with strain (i.e., variation in length), and thus the strain gauge 123 provides an independent measurement of the strain of the surface 126, across the span of the relative displacement 124 of the components 102,104. As illustrated in FIG. 6, the FEA model data 180, from which the selection of the height 134, thickness 136 and radius of curvature 138 parameters of the structure 110 were selected, closely approximates the two independent sets of the estimated strain data 184 and the strain gauge data 182 acquired over the span of the relative displacement 124. Thus, the selected parameters of the structure 110 during the design mode were effective to attenuate the range of strain 122 of the fiber Bragg grating 116 to within the maximum range of strain of the fiber Bragg grating 116 across the span of relative displacement 124 of the components 102,104, and thus the fiber Bragg grating 116 is operable to monitor the relative displacement of the components 102,104 across their relative displacement 124 span.

During a monitoring mode, the system 100 may be used to ensure that the relative displacement 124 of the components 102,104 does not exceed a maximum threshold relative displacement 124. As with the calibration mode above, the detector 140 measures the shift in the respective wavelength with the peak intensity from the reflected radiation. The controller 142 receives the wavelength shift data, and retrieves the stored relative displacement 124 data of the components 102,104 from the memory 143 corresponding to the measured shift in the respective wavelength with the peak intensity. The controller 142 compares the stored relative displacement 124 with a maximum relative displacement of the components 102,104, to determine whether the components 102,104 have displaced beyond the maximum threshold and/or a safety threshold. The controller 142 outputs a signal to an alert device 150, if the stored relative displacement exceeds the maximum relative displacement of the components 102,104. For example, the alert device 150 may be an audible device, to alert workers in the facility housing the components 102,104, that the components 102,104 may have displaced by an unsafe amount, and recommended subsequent action, such as further investigation of the relative displacement.

As illustrated in FIG. 2, the system 100 may be used with more than one pair of components (102,104) (104,106) (106,108), to monitor a relative displacement of the components 102,104,106. The system 100 includes a respective structure 110,112,114 externally mounted to each respective pair of components (102,104) (104,106) (106,108), which effectively form a triangular serpentine network. The system 100 further includes a respective fiber Bragg grating 116, 190, 192 externally mounted to each structure 110,112,114, where the respective fiber Bragg grating 116,190,192 reflects radiation with a peak intensity at a respective wavelength based on a strain of the respective fiber Bragg grating 116,190,192. Although the fiber Bragg gratings 116,190,192 are optically coupled to the same optical fiber 115, they have a unique center-wavelength corresponding to a beginning strain, and thus the reflected wavelength at a peak intensity of the first fiber Bragg grating 116 will not affect the operation of the second fiber Bragg grating 190. The respective structure 110, 112,114 attenuates a range of the strain of the respective fiber Bragg gratings 116,190,192 over a span of the relative displacement of the respective pair of components (102,104) (104,106) (106,108) to within a maximum range of the strain of the respective fiber Bragg grating 116,190,192. The respective structures 110,112,114 may be designed, having individual parameters which may be determined using the model mode discussed above, along with the specific boundary conditions, such as the maximum strain of the fiber Bragg grating, an amount of slack 193,195 in the fibers between the fiber Bragg gratings 116, 190 and 192), and the relative span of each component pair. In addition, reducing the amount of strain and wavelength change of the fiber Bragg gratings 116,190,192 allows one to place more transducers on the same fiber with wavelength division multiplexing since each fiber Bragg grating 116,190,192 requires a smaller portion of the wavelength spectrum available. As discussed above with regard to the structure 110 in FIG. 1, the respective base legs 152,154,153,155 are respectively mounted to the top surfaces 156,157,159,161 of the respective component 102,104,106, 108 with an adhesive 174, such as two-part epoxy, for example. As illustrated in FIG. 2, the respective base legs 152,154,153,155 are respectively mounted to the top surfaces 156,157,159,161 of the respective component 102,104,106, 108 with a respective amount of leveling material 175, such as putty, for example, to equalize a height 176 at which the base legs 152,154,153,155 are mounted to the top surfaces 156, 157,159,161 of the components 102,104,106,108, relative to the fiber 115. For example, a greater amount of leveling material 175 may be positioned on the top surface 156 than the top surface 157, to equalize the height of the top surfaces 156,157.

Figure 7:
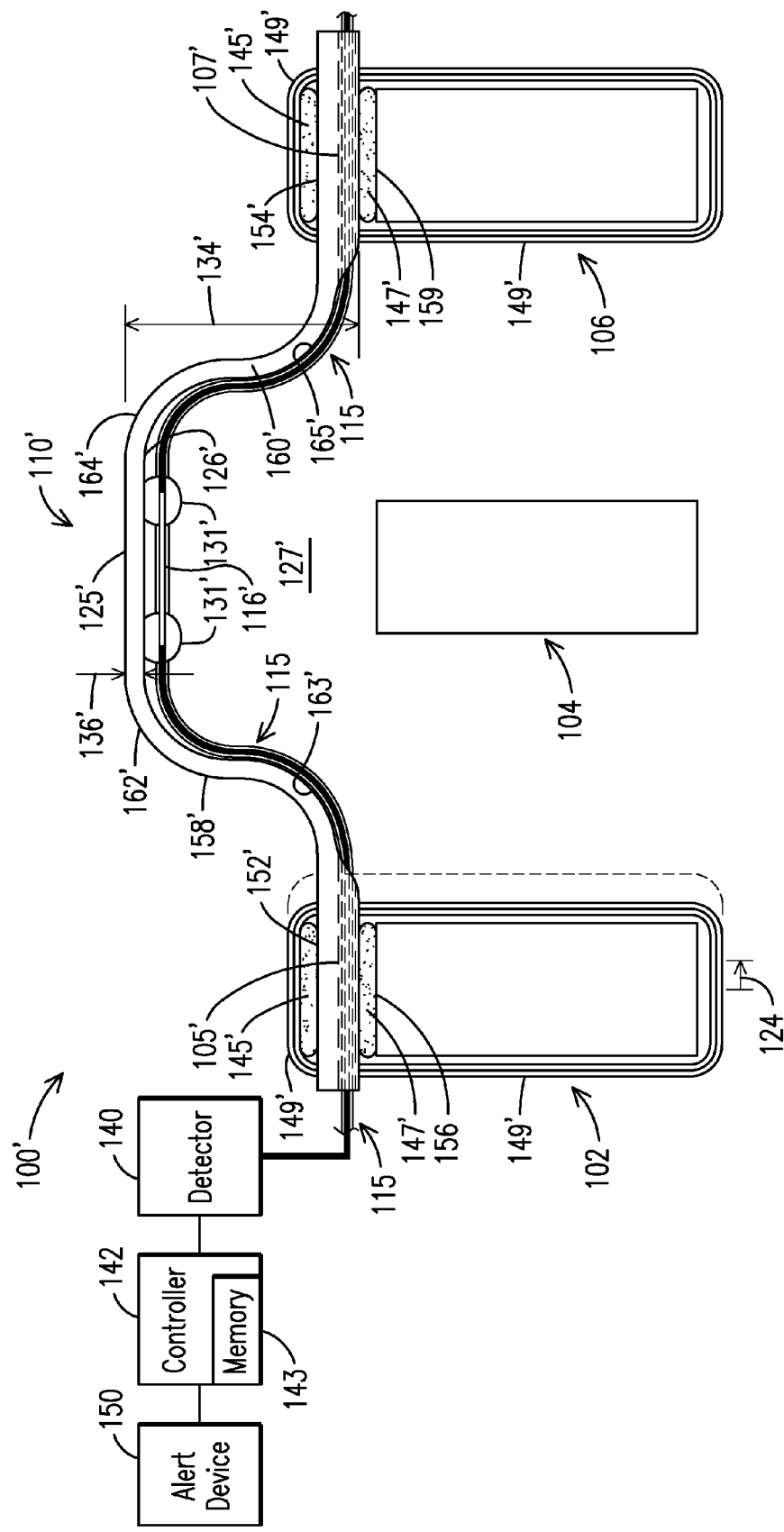
FIG. 7 is a partial side cross-sectional view of a structure and a fiber Bragg grating mounted on a pair of end-winding components according to an example embodiment of the invention.

FIG. 7 illustrates a system 100' for monitoring a relative displacement 124 of a pair of end-winding components 102, 106. For purposes of avoiding pedantic redundancy, in the description below emphasis will be given to structural and/or operational aspects not described in relation to FIGS. 1-6. Similarly, an attempt will be made to avoid description of aspects already described in the context of FIGS. 1-6. For example, unlike the structure 110 of FIG. 1, which is mounted to a consecutive pair of end-winding components 102,104, the structure 110' of FIG. 7 is mounted to a pair of non-consecutive end-winding components 102,106, with an end-winding component 104 positioned between the pair of end-winding components 102,106. Additionally, unlike the structure 110 of FIG. 1, which mounts the fiber Bragg grating 116 to the surface 126, which is a top surface of the structure 110, the structure 110' of FIG. 7 mounts the fiber Bragg grating 116 to a surface 126' which is an interior surface of an interior area 127' of the structure 110'. It should be noted that the differences between the system 100 of FIG. 1 and the system 100' of FIG. 7 mainly include the differences in the structural aspects of the structure 110 of FIG. 1 and the structure 110' of FIG. 7; the difference in mounting the structure 110 of FIG. 1 to the end-winding components 102,104 and in mounting the structure 110' of FIG. 7 to the end-winding components 102,106; and the difference in mounting the fiber Bragg grating 116 to the structure 110 of FIG. 1 and in mounting the fiber Bragg grating 116 to the structure 110' of FIG. 7. However, the system 100' need not include all of these design modifications from the system 100 and may only include one of these listed modifications, for example. In both of the systems 100,100', the controlling mechanisms (detector 140, controller 142 and alert device 150) operate to perform the same function, namely to ensure that a range of strain along the surfaces 126,126' of the respective structures 110, 110' is within a maximum range of strain 122 of the fiber Bragg grating 116, across a span of relative displacement 124 of the respective pair of components (102,104) (102,106). Additionally, in both of the systems 100,100', the controlling mechanisms (detector 140, controller 142, and alert device 150) operate to ensure that the respective pair of components (102,104) (102,106) do not displace beyond a safety threshold, and trigger an alert if such a displacement does occur.

Figure 8:
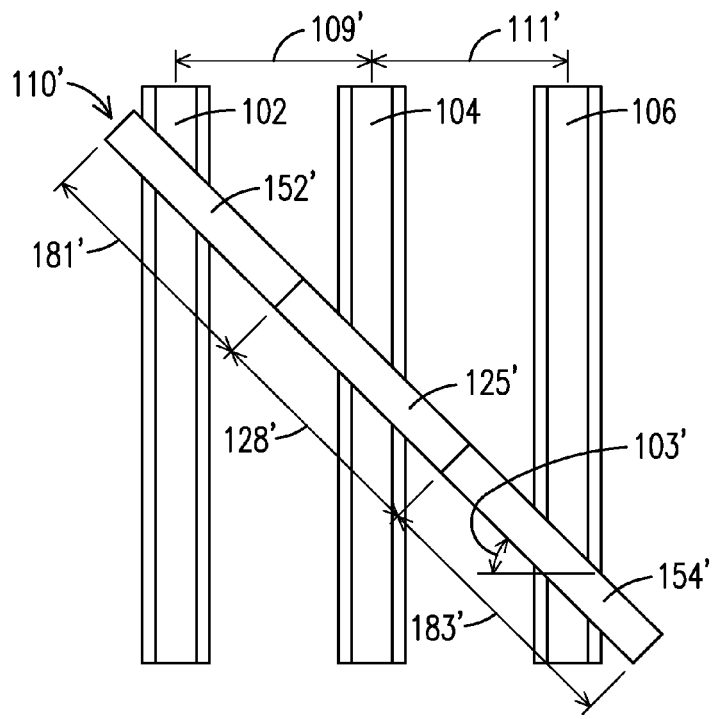
FIG. 8 is a top view of the structure of FIG. 7 mounted on the pair of end-winding components at an example angle.

As illustrated in the system 100' of FIG. 8, the system 100' includes the structure 110' which is mounted to the pair of end-winding components 102,106 such that the structure 110' is oriented at an angle 103' with respect to the pair of end-winding components 102,106 for monitoring the relative displacement. In an exemplary embodiment, the angle 103' may be a non-orthogonal angle with respect to the pair of end-winding components 102,106, such that the relative displacement can be monitored in two dimensions. For example, the angle 103' may be 45 degrees, in order to monitor the relative displacement in two dimensions. However, the angle is not limited to any specific angle. In another exemplary embodiment, the angle 103' may be an orthogonal angle with respect to the pair of end-winding components 102,106. In the exemplary embodiment of FIG. 8, in which the structure 110' is mounted to the pair of end-winding components 102,106 at the angle 103' which is a non-orthogonal angle, the structure 110' can monitor a relative displacement of the pair of end-winding components 102,106, as, for example, may include vector displacement components along a first dimension perpendicular to the alignment of the pair of end-winding components 102,106 and along a second dimension parallel to the alignment of the pair of end-winding components 102,106.

As further illustrated in FIG. 7, the system 100' includes the fiber Bragg grating 116, which is the same fiber Bragg grating 116 that was used in the system 100 of FIGS. 1-6, for example. However, a different model or type of fiber Bragg grating may be used in the system 100' than the fiber Bragg grating that was used in the system 100. The fiber Bragg grating 116 is mounted to the surface 126' of the structure 110'. In an exemplary embodiment of the present invention, the surface 126' may be non-curved. However, the surface 126' is not limited to a non-curved surface and may be curved or have a combination of curved and non-curved portions, for example. As illustrated in FIG. 7, the structure 110' includes a top portion 125' with the surface 126' on an undersurface of the top portion 125' that faces the end-winding components 102,106 when the structure 110' is mounted to the end-winding components 102,106. The structure 110' also includes a pair of base legs 152',154' that are respectively mounted to the pair of end-winding components 102,106 and a pair of intermediate portions 158',160' that join respective ends 170',172' of the base legs 152',154' to outer ends 162',164' of the top portion 125' and include respective fiber-guiding surfaces 163',165'. As with the system 100 of FIG. 1, the fiber Bragg grating 116 is configured to experience a strain resulting from a strain of the structure 110' due to the relative displacement 124 of the pair of end-winding components 102,106. In the exemplary embodiment of FIG. 8, in which the structure 110' is mounted at an angle 103' that is a non-orthogonal angle with respect to the pair of end-winding components 102,106, a relative displacement in either of the first dimension perpendicular to the alignment of the pair of end-winding components 102,106 or the second dimension parallel to the alignment of the pair of end-winding components 102,106 would result in a strain of the surface 126' of the structure 110' in FIG. 7, and thus correspondingly would result in a strain of the fiber Bragg grating 116 attached to the surface 126'.

As further illustrated in FIG. 7, the system 100' includes an optical fiber 115 with a first portion which houses the fiber Bragg grating 116. A second portion of the optical fiber 115 is routed from the detector 140 through a first slot 105' in the first base leg 152' of the structure 110'. The optical fiber 115 is then routed from the outlet of the first slot 105' along the fiber-guiding surface 163' of the intermediate portion 158' and to the surface 126' of the top portion 125'. The outer jacket of the optical fiber 115 housing the fiber Bragg grating 116 is secured to the surface 126' of the top portion 125' with a strain relief component 131' that attaches the outer jacket of the optical fiber 115 to each end 162',164' of the surface 126', as illustrated in FIG. 7. After the outer jacket of the optical fiber 115 is secured to the surface 126', the optical fiber 115 is routed from the surface 126' along the fiber-guiding surface 165' of the intermediate portion 160' and a third portion of the optical fiber 115 is routed through a second slot 107' in the second base leg 154' of the structure 110'. As discussed in greater detail below, the fiber-guiding surfaces 163',165' are formed such that the optical fiber 115 which extends from an outlet of the first slot 105' along the fiber-guiding surface 163', and subsequently along the fiber-guiding surface 165' to an inlet of the second slot 107' maintains a minimum radius of curvature to avoid optical loss due to the optical fiber 115 bending at a radius of curvature below the minimum radius of curvature. The system 100' need not feature the first and second slots 105',107' within the base legs 152',154', and instead may route the optical fiber 115 to the surface 126' using another route or path, for example. As further illustrated in FIG. 7, an adhesive is provided along an interior surface of the first slot 105' and/or the second slot 107' of the structure 110', to secure the optical fiber 115 to the structure 110' along a length 181' of the interior surface of the first slot 105' and/or a length 183' of the interior surface of the second slot 107'. The adhesive along the lengths 181',183' of the slots 105',107' provides enhanced strain relief of the optical fiber 115 to the structure 110', so that the optical fiber 115 will not easily snap or break if an external force is applied to the optical fiber 115 relative to the structure 110'. Additionally, as illustrated in FIG. 7, in addition to the strain relief components 131' which are positioned at outer ends 162',164' of the surface 126', to attach the fiber Bragg grating 116 and the optical fiber 115 to the surface 126', strain relief components 131' may also be provided at an outlet of the first slot 105' and an inlet of the second slot 107', to provide additional strain relief, to prevent an external force applied to the optical fiber 115 from snapping or breaking the optical fiber 115 at the outlet of the first slot 105' and the inlet to the second slot 107'.

As illustrated in FIG. 8, the angle 103' at which the structure 110' is oriented relative to the pair of end-winding components 102,106 can be varied, based on the separation 109', 111' of the pair of end-winding components 102,106. As illustrated in FIG. 8, the separation 109' is the separation between the end-winding components 102,104 and the separation 111' is the separation between the end-winding components 104,106 (measured to the half-width of the components). Thus, the separation between the end-winding components 102,106 is the sum of the separations 109',111'. In an exemplary embodiment, the extent of the angle 103' increases, as the separation 109',111' between the pair of end-winding components 102,106 is reduced. Correspondingly, the extent of the angle 103' decreases, as the separation 109',111' between the pair of end-winding components 102, 106 is increased. For any specific separation 109',111' of the pair of ending-winding components 102,106, the angle 103' may be chosen from a range of eligible angles, based on the respective separation 109',111'. As illustrated in FIG. 8, the structure 110' is formed such that a combined length of the structure 110', which is a sum of a length 128' of the top portion 125', a first length 181' of the first base leg 152' and a second length 183' of the second base leg 154' is a sufficient length such that the base legs 152',154' of the structure 110' span the components 102,106, when the structure 110' is oriented at relatively large angles 103' with respect to the components 102,106. In an exemplary embodiment, where the pair of end-winding components 102,106 are separated by 4.74" (2.37" between each pair of components 102,104 and 104,106) and the structure 110' is oriented at 45 degrees with respect to the components 102,106, the length 128' of the top portion 125' is 2.85" and the combined length 181',128',183' of the structure 110' is 9.00", for example. In another exemplary embodiment, where the pair of end-winding components 102,106 are separated by 3.56" (1.78" between each pair of components 102,104 and 104,106) and the structure 110' is oriented at 45 degrees with respect to the components 102,106, the length 128' of the top portion 125' is 2.85" and the combined length 181',125',183' of the structure 110' is 7.2", for example. Although the above exemplary embodiments list specific examples of dimensions for the spacing of the end-winding components 102,106 and the length of the structure 110', the spacing of the end-winding components 102,106 and the length of the structure 110' is not limited to such dimensions.

Figure 9:
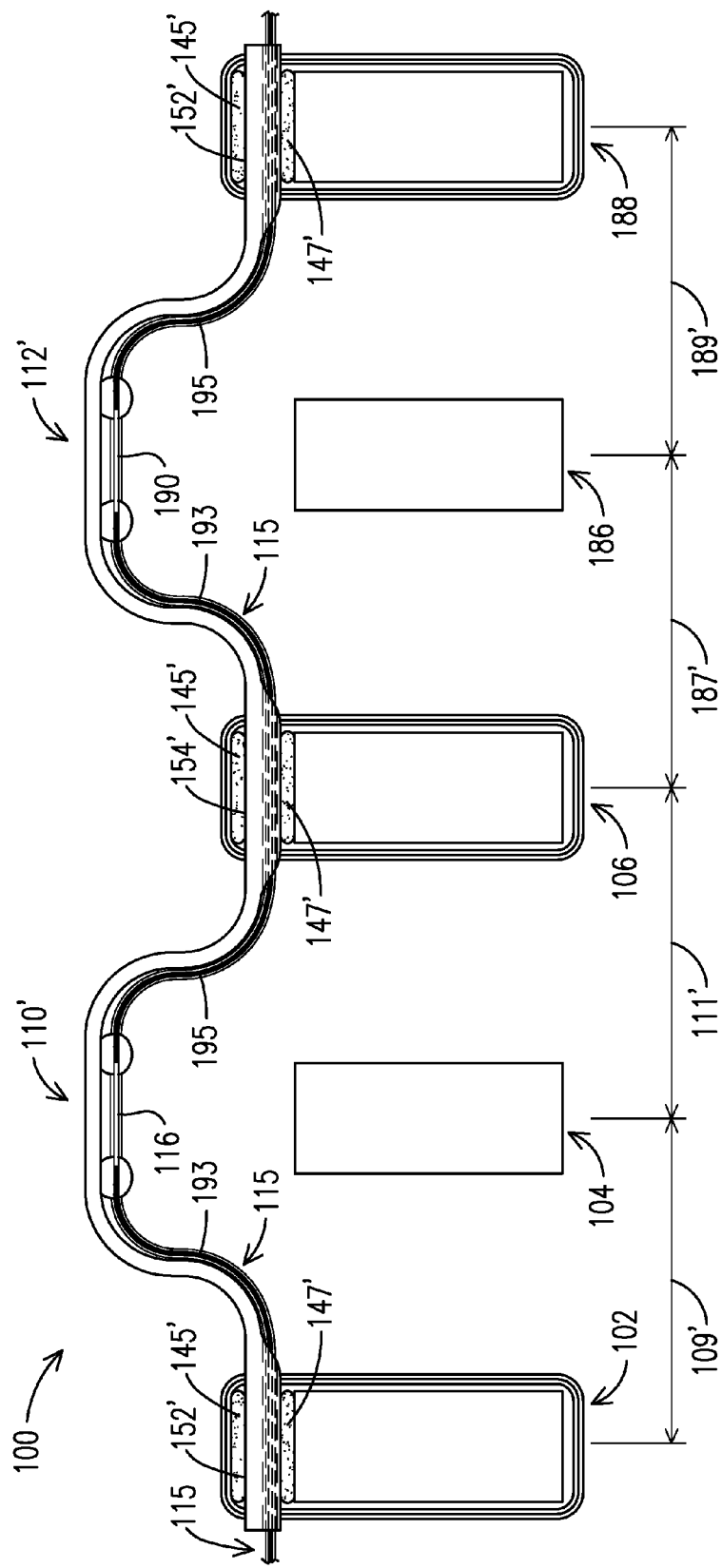
FIG. 9 is a partial side cross-sectional view of a plurality of structures and fiber Bragg gratings mounted on the end-winding components according to another example embodiment of the invention.

As illustrated in FIG. 9, the structure 110' is configured to be mounted to a plurality of pairs of end-winding components (102,106) (106,188) with a respective plurality of separations (109',111') (187',189'). In an exemplary embodiment, the angle 103' of the structure 110' with respect to the end-winding components (106,188) is greater than the angle 103' of the structure 110' with respect to the end-winding components (102,106), if the separation (187',189') between the end-winding components (106,188) is less than the separation (109',111') between the end-winding components (102,106). As further illustrated in FIG. 9, a plurality fiber Bragg gratings 116,190 are arranged within the optical fiber 115, and the respective fiber Bragg grating 116,190 is mounted to a respective structure 110'. Each respective structure 110' is configured using the design mode discussed below, so that the strain produced by the respective structure 110' limits a magnitude of the strain of the respective fiber Bragg grating 116,190 to be within a respective predetermined range such that a wavelength shift 141 from the fiber Bragg grating 116 does not overlap with a wavelength shift from the remaining fiber Bragg grating 190 within the optical fiber 115 over a span of the relative displacement 124 of the pair of end-winding components (102,106) (106,188). Although FIG. 9 illustrates an optical fiber 115 with two fiber Bragg gratings 116,190, example embodiments of the present invention may include an optical fiber with more than two fiber Bragg gratings which are respectively mounted to more than two structures. As further illustrated in the optical fiber 115 of FIG. 9, a slack 193,195 is included in the optical fiber 115 between consecutive fiber Bragg gratings 116,190 such that upon a thermal expansion of an outer jacket relative to an inner fiber of the optical fiber 115, each fiber Bragg grating 116,190 remains mounted to the surface 126' of the respective structure 110'.

Figure 10:
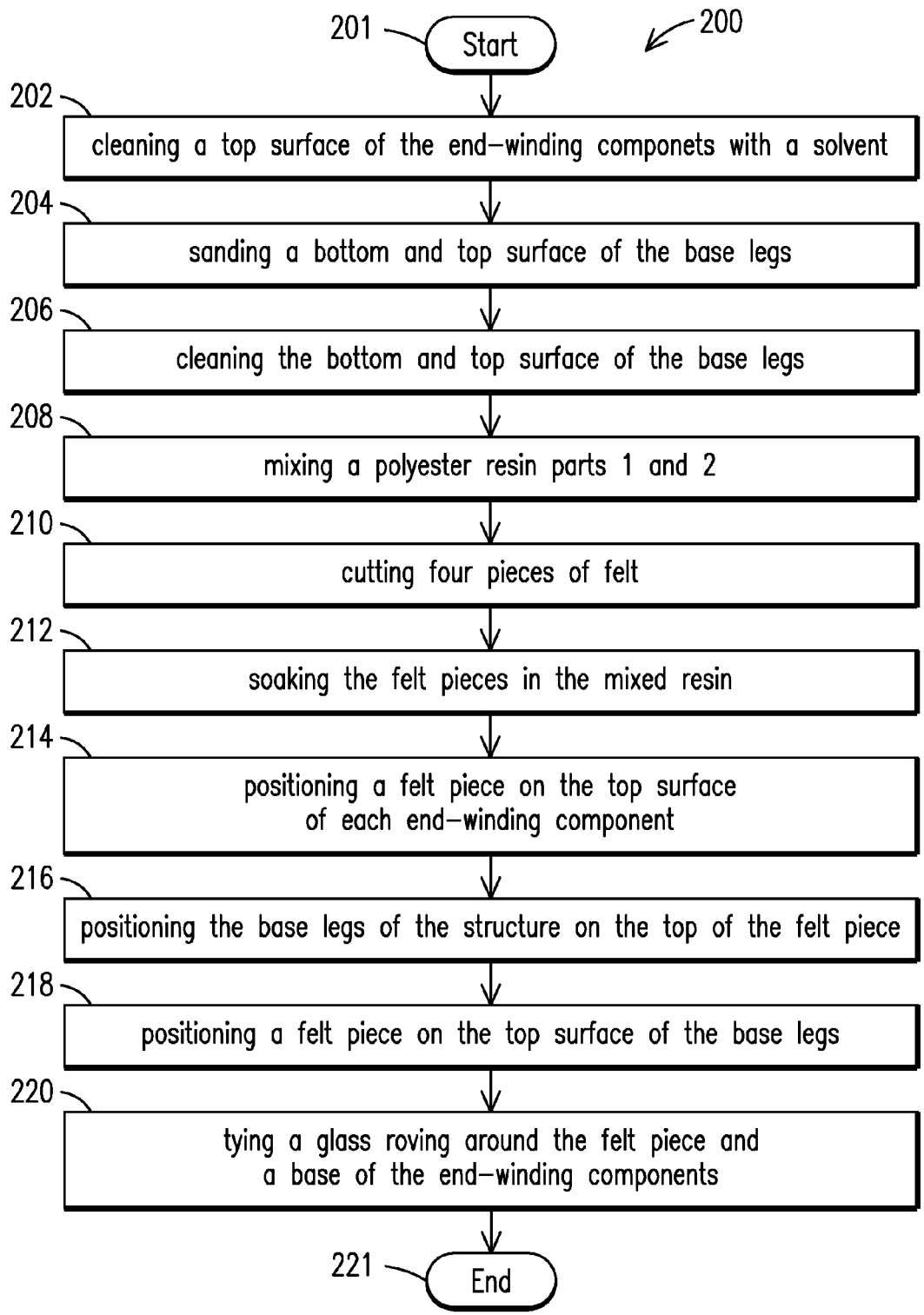
FIG. 10 is a flowchart depicting an example method for mounting the structure on the pair of end-winding components of FIG. 7.

As illustrated in FIG. 10, a flowchart is shown depicting a method 200 for mounting the structure 110' to the pair of end-winding components 102,106, resulting in the arrangement shown in FIG. 7. As illustrated in FIG. 10, the method 200 begins at 201 by cleaning 202 a top surface 156,159 of the end-winding components 102,106 with a solvent to remove oil and loose materials. In an exemplary embodiment, a 503HA264 solvent may be used, for example. The method 200 then involves sanding 204 a bottom and top of the base legs 152',154' with sand paper, such as 120 grit sand paper, for example. The method 200 then involves cleaning 206 a bottom and top surface of the base legs 152',154' with a solvent, such as 503HA264 solvent, for example. The method 200 then involves mixing 208 a polyester resin parts 1 and 2. In an exemplary embodiment, the content of polyester resin part 2 may be placed into polyester resin part 1, and all safety precautions should be followed on the MSDS (Material Safety Data Sheet). The method 200 then involves cutting 210 four pieces of felt. In an exemplary embodiment, four pieces of 1½×¾ felt with a ⅛" thickness is cut. However, this step may involve cutting less or more than four pieces of felt and may cut pieces of felt of any dimension sufficient to mount the structure to the end-winding components. Although the above exemplary embodiment provides one example of specific dimensions for the piece of felt, the pieces of felt of the invention are not limited to such dimensions. The method 200 then involves soaking 212 the felt pieces in the mixed resin thoroughly. The method 200 then involves positioning 214 a felt piece 147' on the top surface 156,159 of each end-winding component 102,106. The method 200 then involves, positioning 216 the base legs 152',154' of the structure 110' on the top of the felt piece 147' on each end-winding component 102, 106. The method 200 then involves positioning 218 a felt piece 149' on top of the base legs 152',154', and tying 220 a glass roving 149' around the felt piece 149' and a base of the end-winding components 102,106. In an exemplary embodiment, the glass roving 149' is soaked in a polyester resin and four strands of the glass roving 149' may be used, in a crisscross pattern, to wrap around the felt piece 149' and the base of the end-winding component 102,106 at least three times. The glass roving 149' is tied around the felt piece 149' and the base of the end-winding components 102,106, so that the structure 110' is aligned at the angle 103' with respect to the end-winding components 102,106. The method 200 subsequently ends at 221.

Figure 11:
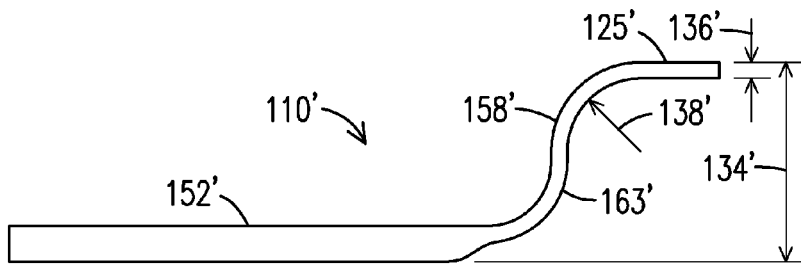
FIG. 11 is a partial cross-sectional side view of the structure in FIG. 7.

As with the system 100 discussed above in FIGS. 1-6, in which the structure 110 was optimized during a design mode, the system 100' similarly involves a design mode for the structure 110' so that the strain produced by the structure 110' limits a magnitude of the strain of the fiber Bragg grating 116 within a predetermined range over a span of the relative displacement 124 of the pair of end-winding components 102,106. During the design mode, one or more parameters of the structure 110' is selected, such that the range of the strain of the surface 126' of the structure 110' over the relative displacement 124 of the components 102,106 is within the predetermined range of the strain 122 of the fiber Bragg grating 116. FIG. 11 illustrates a CAD (Computer Aided Design) model of the structure 110', using the FEA (finite element analysis) model previously discussed. As illustrated in FIG. 11, one parameter of the structure 110' which is optimized during the design mode of the structure 110' is a thickness 136' of the top portion 125'. An increase in the thickness 136' of the top portion 125' correspondingly increases the range of the strain of the surface 126' over a range of displacement 124 of the pair of end-winding components 102,106. In an exemplary embodiment, the design mode of the structure 110' resulted in a thickness 136' of 0.079" for the top portion 125'. Although the exemplary embodiment above lists a specific dimension for the thickness 136' of the top portion 125', the thickness 136' is not limited to any such dimension. As further illustrated in FIG. 11, another parameter of the structure 110' which is optimized during the design mode of the structure 110' is a height 134' of the structure 110' from the top portion 125' to the base legs 152',154'. An increase in the height 134' of the structure 110' correspondingly decreases the range of the strain of the surface 126' over a range of displacement 124 of the pair of end-winding components 102,106. In an exemplary embodiment, the design mode of the structure 110' resulted in a height 134' of 1.046" from the top portion 125' to the base legs 152',154'. Although the exemplary embodiment above lists a specific dimension for the height 134' of the structure 110', the height 134' is not limited to any such dimension. As further illustrated in FIG. 11, another parameter of the structure 110' which is optimized during the design mode of the structure 110' is a radius of curvature 138' of the fiber-guiding surface 163' of the intermediate portion 158', in order to maintain a minimum radius of curvature in the optical fiber 115 which passes from an outlet of the first slot 105' along the fiber-guiding surface 163', as illustrated in FIG. 7. In an exemplary embodiment, the design mode of the structure 110' resulted in a radius of curvature 138' of 0.394" for the fiber-guiding surface 163'. Although the exemplary embodiment above lists a specific dimension for the radius of curvature 138' of the fiber-guiding surface 163', the radius of curvature 138' is not limited to any such dimension. Thus, in an exemplary embodiment of the present invention, the design mode of the structure 110' using the CAD and FEA models previously discussed resulted in a structure 110' with a thickness 136' of 0.079" in the top portion 125'; a height 134' of 1.046" from the top portion 125' to the base legs 152',154' and a radius of curvature 138' of 0.394" for the fiber-guiding surface 163', so that the strain produced by the structure 110' limits a magnitude of the strain of the fiber Bragg grating 116 to be within a predetermined range over a span of the relative displacement 124 of the pair of end-winding components 102,106.

Figure 12:
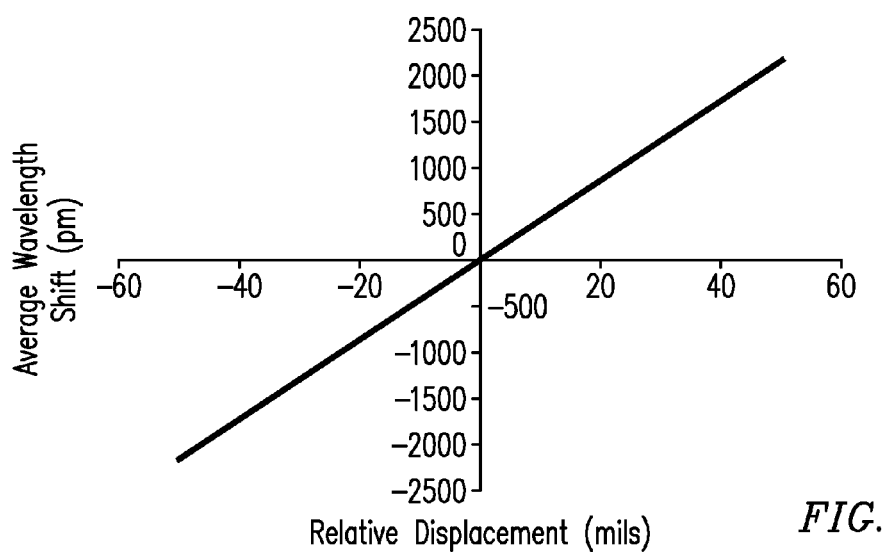
FIG. 12 is a plot of an example wavelength shift of the fiber Bragg grating versus a deflection of the end-winding components for an example fixed height and an example thickness of the structure illustrated in FIG. 3.

Also as with the system 100 of FIGS. 1-6 discussed above, once the parameters of the structure 110' have been chosen during the design mode, the structure 110' is formed and the system 100' switches to a calibration mode in which strain/wavelength shift data of the fiber Bragg grating 116 mounted to the surface 126' of the structure 110' is recorded for incremental displacements of the pair of end-winding components 102,106. As with the calibration mode of the system 100 previously discussed, in order to ensure that the strain produced by the structure 110' limits a magnitude of the strain of the fiber Bragg grating 116 within a predetermined range over a span of the relative displacement 124 of the pair of end-winding components 102,106, a calibration of the fiber Bragg grating 116 is first performed over the range of relative displacement 124 of the end-winding components 102,106. As illustrated in FIG. 7, the system 100' further includes a detector 140 that functions similar to the detector 140 of FIG. 1, namely to measure a shift 141 in a respective wavelength of reflected radiation from the fiber Bragg grating 116 with a peak intensity at respective incremental displacements across the span of the relative displacement 124 of the end-winding components 102,106. FIG. 12 illustrates a plot of the wavelength shift 141 versus the incremental displacement of the end-winding components 102,106 over the span of displacement 124 of the end-winding components 102,106. As previously discussed in the embodiments of FIGS. 1-6, the strain of the fiber Bragg grating 116 is proportional to the wavelength shift 141 of the reflected radiation from the fiber Bragg grating 116. In an exemplary embodiment, the maximum strain of the fiber Bragg grating 116 may occur at a wavelength shift of +/−2500 pm. As illustrated in the plot of FIG. 12, based on the maximum wavelength shift 141 of less than +/−2500 pm over the span of the relative displacement 124 of the end-winding components 102,106, the structure 110' has ensured that the strain produced by the surface 126' limits the magnitude of the strain of the fiber Bragg grating 116 to within a predetermined range over the span of the relative displacement 124 of the end-winding components 102,106. In addition to the detector 140, the controller 142 may be provided, to convert the shift 141 in the respective wavelength of the reflected radiation having the peak intensity into the strain 122 of the fiber Bragg grating 116 over the respective incremental displacement across the span of the relative displacement 124 of the end-winding components. During the calibration mode, the respective wavelength shift 141 of the reflected radiation having the peak intensity and the respective strain 122 of the fiber Bragg grating 116 over the respective incremental displacements are stored in a memory 143 of the controller 142 for the respective angle 103'. Thus, each angle 103' may have a distinct set of wavelength shifts 141 and strains 122, at each incremental displacement of the end-winding components 102,106.

Also as with the system 100 of FIGS. 1-6 discussed above, once the calibration mode above is performed, the system 100' may be used in a monitoring mode, to ensure that the displacement 124 of the pair of end-winding components 102,106 does not exceed a safety threshold. The detector 140 measures the shift 141 in the respective wavelength having the peak intensity from the reflected radiation. The controller 142 retrieves the stored relative displacement of the end-winding components 102,106 from the memory 143 corresponding to the measured shift 141 in the respective wavelength having the peak intensity and the angle 103' of the structure 110' with respect to the components 102,106. The controller 142 compares the stored relative displacement with a predetermined relative displacement of the end-winding components 102,106, where the predetermined relative displacement is based on the angle 103', to determine whether the components 102,106 have displaced beyond a safety threshold. For example, as the angle 103' increases, the predetermined relative displacement decreases since the relative displacement 124 of the pair of end-winding components 102,106 is reduced as the angle 103' increases, and thus the predetermined relative displacement would correspondingly be reduced. The controller 142 outputs a signal to an alert device 150, when the stored relative displacement exceeds the predetermined relative displacement of the end-winding components. As illustrated in FIG. 7, the pair of end-winding components 102,106 are separated by a third end-winding component 104. The system 100' is configured to monitor a relative displacement of the pair end-winding components 102,106 and a relative displacement between one of the pair of end-winding components 102,106 and the third end-winding component 104.

While aspects of the invention have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A system for monitoring a relative displacement of a pair of end-winding components, said system comprising:
 a structure mounted to the pair of end-winding components such that the structure is oriented at an angle with respect to the pair of end-winding components for monitoring the relative displacement;
 an optical fiber with a first portion including a fiber Bragg grating, said first portion mounted to a surface of the structure, said fiber Bragg grating configured to experience a strain resulting from a strain of the structure due to the relative displacement of the pair of end-winding components;
 the optical fiber including a second portion internally routed in the structure to the first portion mounted to the surface;
 wherein the structure is configured so that the strain produced by the structure limits a magnitude of the strain of the fiber Bragg grating within a predetermined range over a span of the relative displacement of the pair of end-winding components.

2. The system of claim 1, wherein the angle is a non-orthogonal angle with respect to the pair of end-winding components for monitoring the relative displacement in two dimensions.

3. The system of claim 1, wherein the angle is an orthogonal angle with respect to the pair of end-winding components.

4. The system of claim 1, wherein the angle is varied based on a spatial separation of the pair of end-winding components.

5. The system of claim 1, wherein the structure is configured to be mounted to a plurality of pairs of end-winding components having a respective plurality of separations; wherein the angle of the structure to be mounted to each respective pair of end-winding components increases as the respective separation of the pair of end-winding components is reduced.

6. The system of claim 1, wherein said second portion of the optical fiber is internally routed through a slot in the structure and wherein an adhesive is provided along an interior surface of the slot of the structure to secure the optical fiber outer jacket to the structure along a length of the interior surface of the slot.

7. The system of claim 1, wherein a plurality of fiber-guiding surfaces are arranged such that the optical fiber which extends from a slot in the structure to the surface maintains a minimum radius of curvature.

8. The system of claim 1, wherein the surface is selected from the group consisting of a curved surface, a non-curved surface, or a combination of a curved surface and a non-curved surface.

9. The system of claim 1, wherein the structure comprises:
a top portion including the surface facing the pair of end-winding components;
a pair of base legs including a first base leg with a first slot and a second base leg with a second slot;
a pair of intermediate portions to join a respective end of the pair of base legs to a respective outer end of the top portion;
wherein the optical fiber is internally routed through the first slot to the surface, and wherein the optical fiber is extended from the surface and internally routed through the second slot.

10. The system of claim 1, further comprising:
a detector configured to measure a shift in a respective wavelength of reflected radiation from the fiber Bragg grating having a peak intensity at respective incremental displacements across the span of the relative displacement of the end-winding components;
a controller coupled to the detector, said controller configured to convert the shift in the respective wavelength of the reflected radiation having the peak intensity into the strain of the fiber Bragg grating over the respective incremental displacement across the span of the relative displacement of the end-winding components;
wherein during a calibration mode, the respective wavelength shift of the reflected radiation having the peak intensity and the respective strain of the fiber Bragg grating over the respective incremental displacements are stored in a memory of the controller for the respective angle.

11. The system of claim 10, during a monitoring mode:
said detector is configured to measure the shift in the respective wavelength having the peak intensity from the reflected radiation;
said controller is configured to retrieve the stored relative displacement of the end-winding components from the memory corresponding to the measured shift in the respective wavelength having the peak intensity;
said controller is configured to compare the stored relative displacement with a predetermined relative displacement of the end-winding components, said predetermined relative displacement based on the angle, to determine whether the components have displaced beyond a safety threshold; and
said controller is configured to output a signal to an alert device, based on the stored relative displacement having exceeded the predetermined relative displacement of the end-winding components.

12. The system of claim 1, wherein the pair of end-winding components are separated by a third end-winding component; wherein the system is configured to monitor a relative displacement of the pair end-winding components and a relative displacement between one of the pair of end-winding components and the third end-winding components.

13. The system of claim 9, wherein at least one parameter of the structure is selected, such that the range of the strain of the surface of the structure over the relative displacement of the components is within the predetermined range of the strain of the fiber Bragg grating.

14. The system of claim 13, wherein the parameter is a thickness of the top portion, wherein an increase in the thickness of the top portion correspondingly increases the range of the strain of the surface.

15. The system of claim 13, wherein the parameter is a height of the structure from the top portion to the base legs, wherein an increase in the height of the structure correspondingly decreases the range of the strain of the surface.

16. The system of claim 9, wherein one base leg of the structure is mounted to one of the pair of end winding components based on:
a respective first piece of resin-soaked felt positioned on a respective top surface of the end winding component;
the one base leg being mounted on the respective first piece of resin-soaked felt on the end winding component;
a respective second piece of resin-soaked felt positioned over the base leg mounted on the respective first piece of resin-soaked felt;
a resin-soaked glass roving tie wrapped at least two times around the respective second piece of resin-soaked felt and a base of each end winding component;
wherein the respective first piece of resin-soaked felt, the respective second piece of resin-soaked felt and the resin-soaked glass roving are arranged such that the structure is aligned at the angle with respect to the pair of end-winding components.

17. A system for monitoring a relative displacement of a pair of end-winding components, said system comprising:
a structure including a first base leg and a second base leg respectively mounted to the pair of end-winding components;
an optical fiber with a first portion including a fiber Bragg grating, said first portion mounted to a surface of the structure, said fiber Bragg grating configured to experience a strain resulting from a strain of the structure due to the relative displacement of the pair of end-winding components;
the optical fiber including a second portion internally routed through a first slot in the first base leg to the first portion mounted to the surface, said optical fiber further routed from the surface to a third portion of said optical fiber internally routed through a second slot in the second base leg;
wherein the structure is configured so that the strain produced by the structure limits a magnitude of the strain of the fiber Bragg grating within a predetermined range over a span of the relative displacement of the pair of end-winding components.

18. The system of claim 17, wherein the structure is mounted to the pair of end-winding components such that the structure is oriented at a non-orthogonal angle with respect to the pair of end-winding components for monitoring the relative displacement in two dimensions.

19. The system of claim 17, wherein a plurality of structures are respectively mounted to a respective plurality of pairs of end-winding components; wherein a plurality of fiber Bragg gratings are arranged within the optical fiber; wherein a respective fiber Bragg grating is mounted to a respective structure; wherein each respective structure is configured so that the strain produced by the respective structure limits a magnitude of the strain of the respective fiber Bragg grating within a respective predetermined range such that a wavelength shift from each respective fiber Bragg grating does not overlap with a wavelength shift from the remaining fiber Bragg gratings within the optical fiber over a span of the relative displacement of the pair of end-winding components.

20. The system of claim 19, wherein a slack is included in the optical fiber between consecutive fiber Bragg gratings such that upon a thermal expansion of an outer jacket relative to an inner fiber of the optical fiber, each fiber Bragg grating remains mounted to the surface of the respective structure.

21. A power generation device, comprising:

a pair of end-winding components configured to undergo a relative displacement during an operation of the power generation device;

a structure mounted to the pair of end-winding components such that the structure is oriented at an angle with respect to the pair of end-winding components for monitoring the relative displacement; and an optical fiber with a first portion including a fiber Bragg grating, said first portion mounted to a surface of the structure, said optical fiber including a second portion internally routed within the structure to the first portion mounted to surface;

wherein said fiber Bragg grating is configured to experience a strain resulting from a strain of the structure due to the relative displacement of the pair of end-winding components;

and wherein the structure is configured so that the strain produced by the structure limits a magnitude of the strain of the fiber Bragg grating within a predetermined range over a span of the relative displacement of the pair of end-winding components.

* * * * *

UNITED STATES PATENT AND TRADEMARK OFFICE
CERTIFICATE OF CORRECTION

PATENT NO. : 8,514,409 B2
APPLICATION NO. : 13/362258
DATED : August 20, 2013
INVENTOR(S) : Koste et al.

It is certified that error appears in the above-identified patent and that said Letters Patent is hereby corrected as shown below:

In the Specification

In Column 8, Line 15, in Equation 1, delete "$\in = \Delta\lambda / |\lambda| G * 10^6$" and insert -- $\in = \Delta\lambda / |\lambda| / G * 10^6$ --, therefor.

In Column 13, Line 39, delete "1½×¾" and insert -- 1½"×¾" --, therefor.

Signed and Sealed this
Twenty-ninth Day of October, 2013

Teresa Stanek Rea
*Deputy Director of the United States Patent and Trademark Office*